United States Patent
Lee et al.

(10) Patent No.: US 11,983,729 B1
(45) Date of Patent: May 14, 2024

(54) SYSTEM AND METHOD FOR EVALUATING RESIDENTIAL SATISFACTION BASED ON RESIDENT'S PERSONAL TENDENCY AND SENSING DATA

(71) Applicant: KOREA ELECTRONICS TECHNOLOGY INSTITUTE, Seongnam-si (KR)

(72) Inventors: Min Goo Lee, Seoul (KR); Yong Kuk Park, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/469,316

(22) Filed: Sep. 18, 2023

(30) Foreign Application Priority Data

Oct. 20, 2022 (KR) ........................ 10-2022-0135492

(51) Int. Cl.
*G06Q 30/0203* (2023.01)
*G06Q 50/16* (2012.01)
*G06Q 50/163* (2024.01)

(52) U.S. Cl.
CPC ....... *G06Q 30/0203* (2013.01); *G06Q 50/163* (2013.01)

(58) Field of Classification Search
CPC .................................................. G06Q 30/0203
See application file for complete search history.

(56) References Cited

U.S. PATENT DOCUMENTS

| | | | | |
|---|---|---|---|---|
| 11,056,242 B1* | 7/2021 | Jain | .................... | G16H 10/60 |
| 11,127,506 B1* | 9/2021 | Jain | .................... | H04W 4/021 |
| 11,342,051 B1* | 5/2022 | Jain | .................... | G16H 10/60 |
| 11,456,080 B1* | 9/2022 | Jain | .................... | A61B 5/4815 |
| 11,504,011 B1* | 11/2022 | Jain | .................... | G06N 5/04 |
| 2005/0113650 A1* | 5/2005 | Pacione | ................ | A61B 5/165 |
| | | | | 600/300 |

(Continued)

FOREIGN PATENT DOCUMENTS

| KR | 10-2018-0138098 A | 12/2018 |
|---|---|---|
| KR | 10-2019-0102391 A | 9/2019 |

(Continued)

OTHER PUBLICATIONS

Wang et al, Integrated sensor data processing for occupancy detection in residential buildings, Energy and Buildings vol. 237, Apr. 15, 2021, 110810 (Year: 2021).*

(Continued)

*Primary Examiner* — Andre D Boyce
(74) *Attorney, Agent, or Firm* — Knobbe, Martens, Olson & Bear, LLP

(57) ABSTRACT

A system evaluates residential satisfaction of residents living in a building, based on personal tendencies of the residents and sensing data collected through sensors in the building. The system may include a server that evaluates the residential satisfaction of the residents by analyzing a correlation between the sensing data and residential satisfaction information obtained from the survey conducted through a communication manner including the user terminals. The server may control an air conditioning system in the building of a control target by predicting a feature-based preferred section of the users through random forest model learning.

9 Claims, 11 Drawing Sheets

(56) References Cited

U.S. PATENT DOCUMENTS

| | | | | |
|---|---|---|---|---|
| 2009/0177068 | A1* | 7/2009 | Stivoric | A61B 5/0022 600/365 |
| 2015/0168003 | A1* | 6/2015 | Stefanski | F24F 11/64 165/268 |
| 2015/0371347 | A1* | 12/2015 | Hayward | G16H 10/20 705/314 |
| 2019/0347670 | A1* | 11/2019 | Abramson | G06N 5/027 |
| 2021/0005316 | A1* | 1/2021 | Neumann | G06N 3/08 |
| 2021/0151195 | A1* | 5/2021 | Hayward | G06Q 50/16 |
| 2022/0148699 | A1* | 5/2022 | Kogan | G16H 10/20 |
| 2022/0277409 | A1* | 9/2022 | Shao | G06Q 10/06375 |
| 2023/0033659 | A1* | 2/2023 | Lee | H04H 60/31 |
| 2023/0187073 | A1* | 6/2023 | Foschini | G16H 50/80 705/2 |
| 2023/0274323 | A1* | 8/2023 | Yang | G06Q 30/0203 705/7.32 |

FOREIGN PATENT DOCUMENTS

| | | |
|---|---|---|
| KR | 10-2021-0100355 A | 8/2021 |
| WO | WO 2018/016776 A1 | 1/2018 |

OTHER PUBLICATIONS

H. Zhang, X. Yang, R. Tu, J. Huang and Y. Li, "Thermal Comfort Modeling of Office Buildings Based on Improved Random Forest Algorithm," 2022 IEEE 11th Data Driven Control and Learning Systems Conference (DDCLS), Chengdu, China, 2022, pp. 1369-1376 (Year: 2022).*

Formegusto/survey-learning-system, Mar. 26, 2022, retrieved from https://github.com/formegusto/survey-learning-system.

Shin et al., "Development of a Machine Learning Model for a Chiller using Random Forest Algorithm and Data Pre-processing", Journal of the Architectural Institute of Korea Structure & Construction vol. 33 No. 9 (Serial No. 347) Sep. 2017, pp. 67-74.

Office Action dated Jan. 1, 2023 in Korean Application No. 10-2022-0135492, in 13 pages.

Office Action dated Jan. 1, 2023 in Korean Application No. 10-2022-0135500, in 15 pages.

Notice of Allowance dated Jun. 19, 2023 in Korean Application No. 10-2022-0135492, in 6 pages.

Notice of Allowance dated Apr. 10, 2023 in Korean Application No. 10-2022-0135500, in 6 pages.

* cited by examiner

[Table 7]

User #1 / importance features: ['hum', 'dust', 'skin']

| | no | temp | hum | lux | dust | decibel | smell | congestion | skin | score |
|---|---|---|---|---|---|---|---|---|---|---|
| 0 | 0 | 21 | 33 | 400 | 120 | 4 | 4 | 8 | 37 | 126 |
| 1 | 1 | 27 | 77 | 400 | 70 | 9 | 0 | 6 | 37 | 124 |
| 2 | 2 | 10 | 73 | 1900 | 100 | 4 | 1 | 3 | 25 | 116 |
| 3 | 3 | 26 | 75 | 1500 | 110 | 14 | 5 | 3 | 31 | 139 |
| 4 | 4 | 21 | 78 | 500 | 70 | 8 | 4 | 5 | 25 | 121 |

[Table 9]

[Table 10]

[Table 14]

[Table 16]

SYSTEM AND METHOD FOR EVALUATING
RESIDENTIAL SATISFACTION BASED ON
RESIDENT'S PERSONAL TENDENCY AND
SENSING DATA

CROSS REFERENCE TO RELATED
APPLICATION

The present application claims priority to Korean Patent Application No. 10-2022-0135492, filed Oct. 20, 2022, the entire contents of which are incorporated herein for all purposes by this reference. This application relates to U.S. Patent Application No. 18/469,381, filed Sep. 18, 2023, entitled "System and method for evaluating residential satisfaction based on resident's preferred section," the entire contents of which are incorporated herein for all purposes by this reference.

BACKGROUND

Technical Field

The present disclosure relates to a system and method for evaluating and predicting residential satisfaction of residents living in a building, based on personal tendencies of the residents and sensing data collected through sensors in the building, so as to optimally manage a living environment in terms of energy saving.

Description of Related Technology

There may be several technologies for providing an optimal living environment to residents living in a building. For example, there may be a technology that provides the most comfortable space environment for residents and prevents energy from being wasted in facilities used for building management. To this end, it is necessary to develop a residential satisfaction evaluation system that can objectively and systematically evaluate the satisfaction felt by residents.

SUMMARY

One aspect is a system and method for evaluating and predicting residential satisfaction of residents living in a building, based on personal tendencies of the residents and sensing data collected through sensors in the building, so as to optimally manage a living environment.

Another aspect is a system for evaluating residential satisfaction of users living in a building, based on personal tendencies of the users and sensing data collected in the building, that includes a sensor group sensing residential satisfaction influencing factors, which affect the residential satisfaction, and outputting the sensing data; user terminals participating in a residential satisfaction survey; and a server evaluating the residential satisfaction of the users by analyzing a correlation between the sensing data and residential satisfaction information obtained from the survey conducted through a communication manner including the user terminals, and controlling an air conditioning system in the building of a control target by predicting a feature-based preferred section of the users through random forest model learning.

In an embodiment, the server includes a survey unit collecting the sensing data and collecting survey result data according to the survey conducted targeting the users in the building; a user-specific random forest model learning unit training a random forest model by using the sensing data and the survey result data as training data, removing data with a participation rate lower than a predetermined reference value in the survey, performing learning only with data with a participation rate higher than the predetermined reference value; a user selecting unit selecting a user having a feature-based scoring rule by referring to a feature importance supplied from the user-specific random forest model learning unit; and a building random forest model learning unit performing learning of a random forest model of the building itself based on data of users having regularity derived by the user selecting unit.

In an embodiment, the user selection unit selects users who have the feature-based scoring rule as users who faithfully participate in the residential satisfaction survey, and derives only data of users who have regularity in survey scores, and a training dataset used in the random forest model by the building random forest model learning unit is "sensor measurement values supplied by the survey unit—an average survey score of users supplied by the user selecting unit".

In an embodiment, the residential satisfaction influencing factors in the sensor group includes one or more heat, brightness, dust, noise, smell, congestion, and skin temperature.

In an embodiment, the survey unit performs preprocessing to distinguish the residential satisfaction survey data obtained from users who faithfully conducted the survey and to identify influencing factors that have a significant effect on the residential satisfaction of the users in the building.

In an embodiment, the survey unit distinguishes the residential satisfaction survey data of survey respondents who faithfully conducted the survey among users who participated in the survey.

In an embodiment, the user-specific random forest model learning unit records features evaluated as having high importance among features used to predict a label by a random forest in learning data and target data used in model learning.

In an embodiment, the user-specific random forest model learning unit performs learning of the random forest model by configuring user objects including one or more of temperature, humidity, illuminance, dust, noise, smell, congestion, and skin temperature as the residential satisfaction influencing factors, assigning a predetermined specific score to each residential satisfaction influencing factors, and applying a range of appropriate values for each residential satisfaction influencing factor and a rule for calculating deducted points.

In an embodiment, the building random forest model learning unit users the sensor measurement value as a feature value of training data, and users an average survey score of the users as a correct answer value.

In an embodiment, the building random forest model learning unit calculates an average value of survey scores using survey data of users whose participation in the survey is higher than a predetermined reference value.

In an embodiment, the building random forest model learning unit uses the calculated average value as a risk level (label).

The residential satisfaction evaluation system and method based on residents' personal tendencies and building sensing data according to the present disclosure have the following effects.

First, there is an effect that can objectively and systematically evaluate residential satisfaction in consideration of personal tendencies and spatial environment information data, thereby contributing to the spread of building-customized energy saving systems and facilities.

Second, there is an effect that can minimize the infringement on the residential satisfaction of individual residents in the building energy saving process.

DETAILED DESCRIPTION

Figure 1:
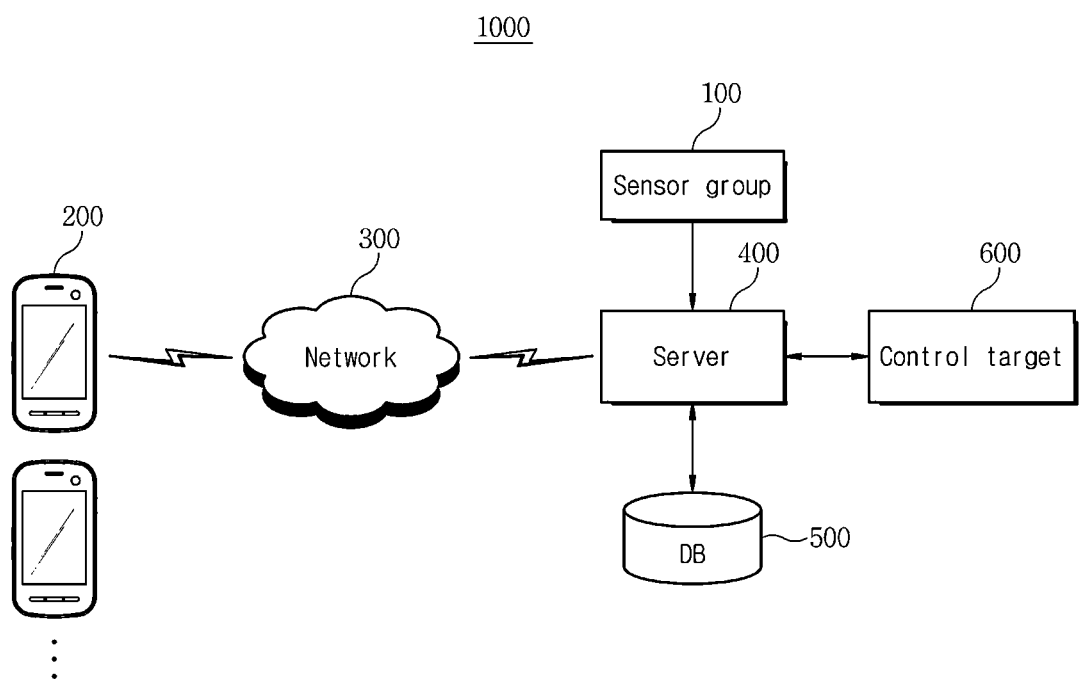
FIG. 1 is an overall block diagram illustrating a residential satisfaction evaluation system based on residents' personal tendencies and building sensing data, according to an embodiment of the present disclosure.

In a building management system, it is known that in summer an appropriate indoor temperature is 22 to 26 degrees and an appropriate humidity is 40 to 60%, and it is necessary to manage air conditioners, etc. to maintain proper temperature and humidity in a building. In addition, in terms of energy saving, indoor temperature standards are recommended for buildings of a certain size or larger to manage the cooling and heating temperature of the building. For example, it is recommended to maintain the indoor temperature of the building at 26 degrees or higher during the summer season (June-September) and at 20 degrees or lower during the winter season (November-March) to manage the cooling and heating temperature of the building.

Such a standard for the appropriate temperature in the conventional building management system may be suitable for a general case or for a specific purpose (e.g., energy saving), but it does not take into account the personal tendencies and residential satisfaction of various residents living in the building. Thus, it may act as a factor that causes inconvenience to residents.

Therefore, residents of respective rooms in the building arbitrarily control the temperature of the air conditioner. So, not only can the energy saving effect not be achieved, but also a problem arises in that the satisfaction of the residents is not great.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Figure 2:
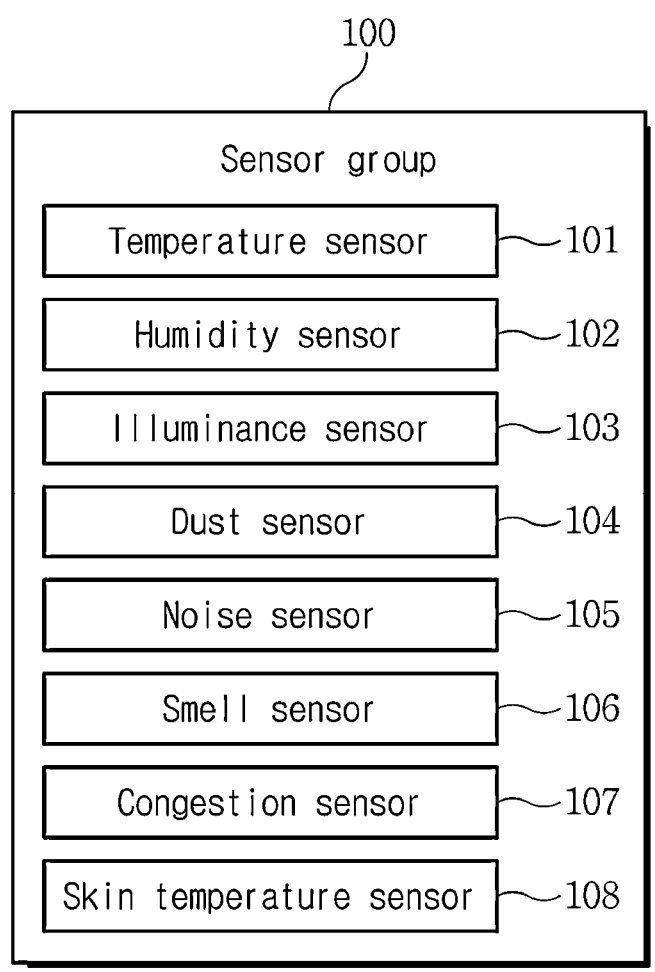
FIG. 2 is a detailed block diagram of a sensor group.
Figure 3:
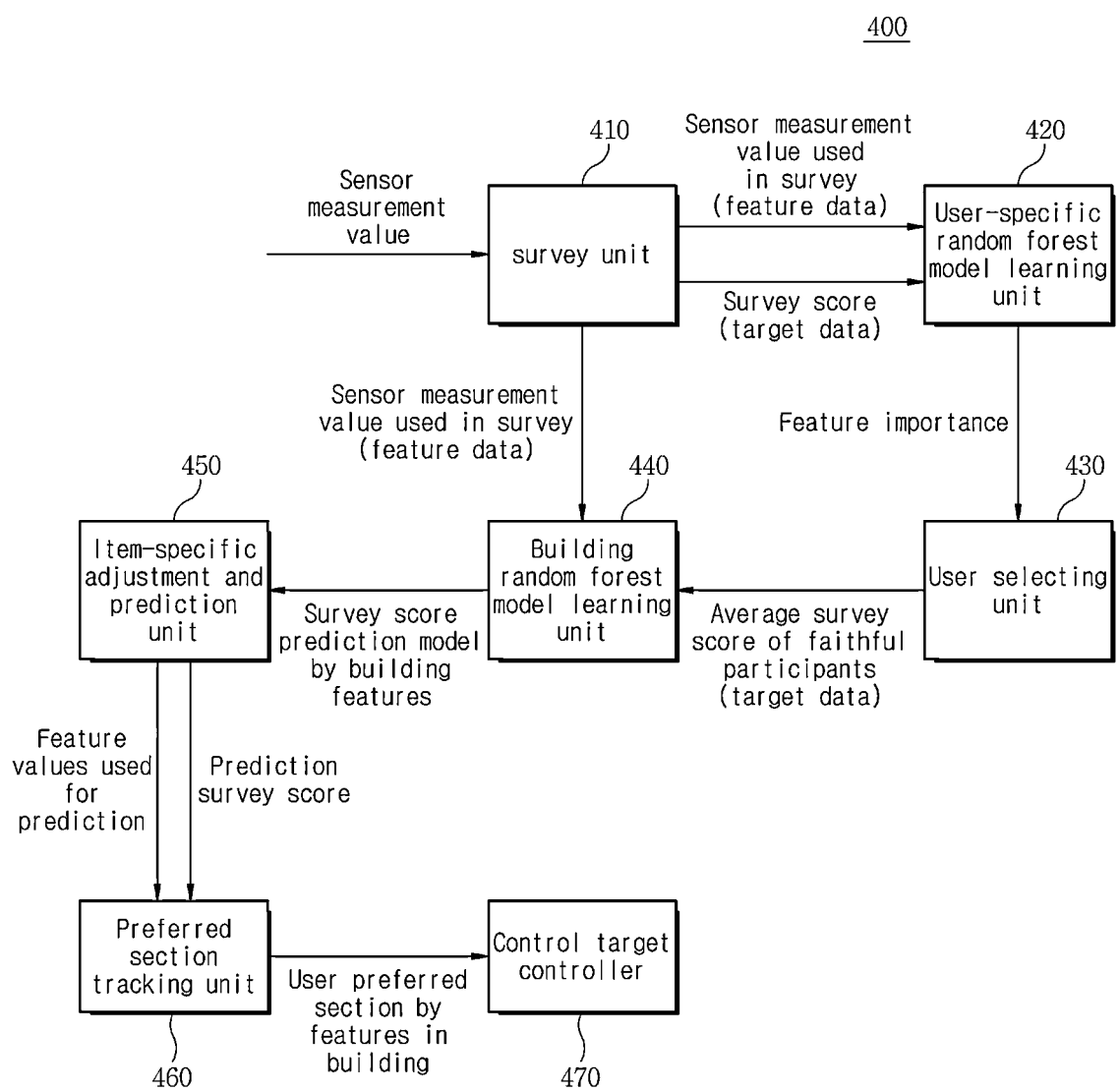
FIG. 3 is a detailed block diagram of a server.
Figure 4:
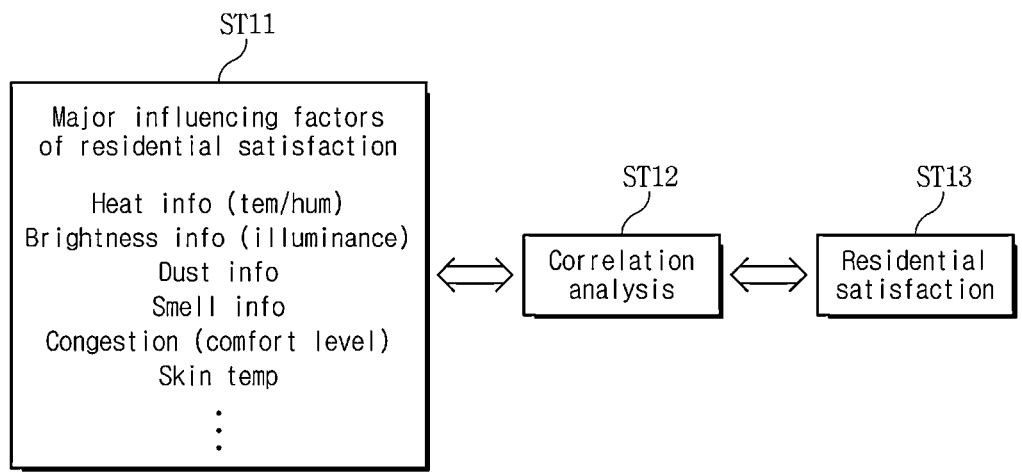
FIG. 4 is an explanatory diagram illustrating a process of predicting and evaluating residential satisfaction by analyzing a correlation between sensing data and residential satisfaction information.
Figure 5:
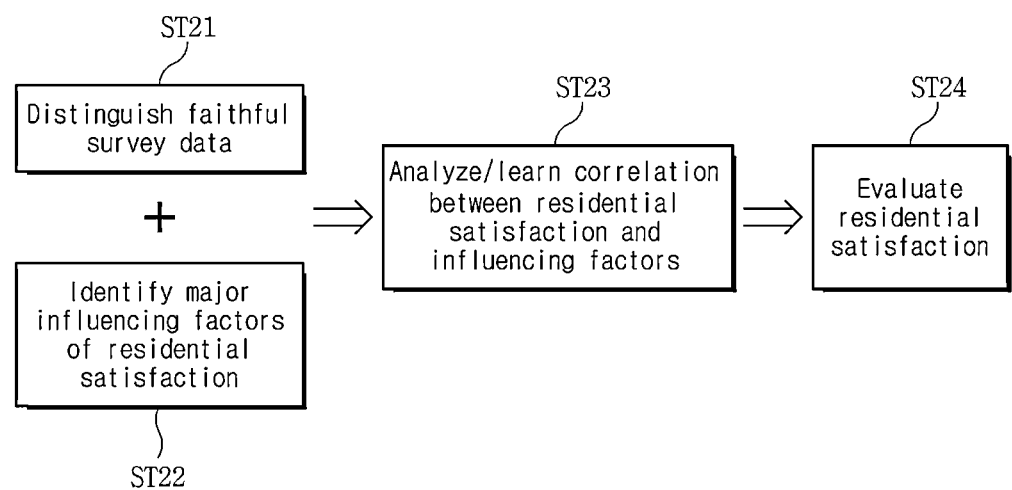
FIG. 5 is an explanatory diagram illustrating a process of evaluating residential satisfaction in a building.
Figure 6:
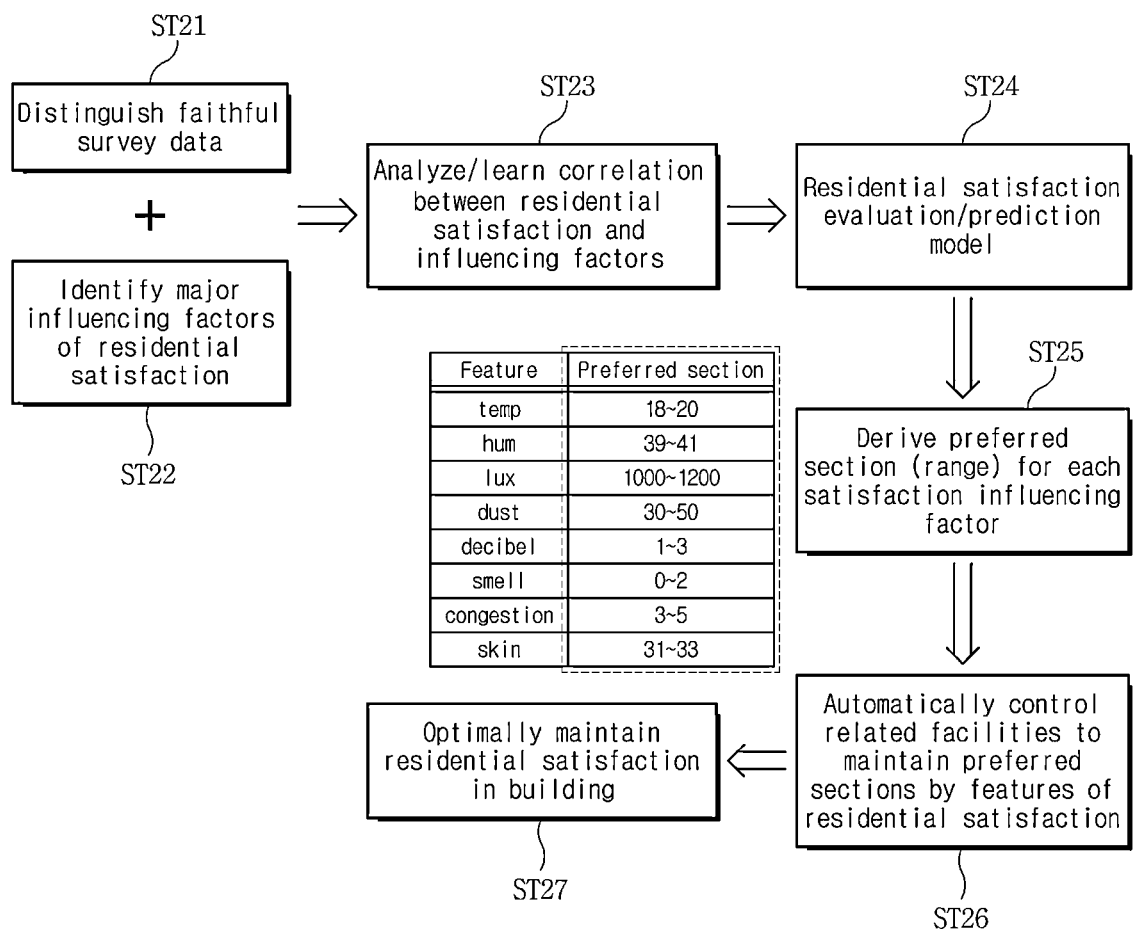
FIG. 6 is an explanatory diagram illustrating a process of evaluating residential satisfaction and automatically controlling related facilities.

FIG. 1 is an overall block diagram illustrating a residential satisfaction evaluation system 1000 based on residents' personal tendencies and building sensing data, according to an embodiment of the present disclosure. FIG. 2 is a detailed block diagram of a sensor group 100 shown in FIG. 1, and FIG. 3 is a detailed block diagram of a server 400 shown in FIG. 1. FIG. 4 is an explanatory diagram illustrating a process of predicting and evaluating residential satisfaction by analyzing a correlation between sensing data and residential satisfaction information. FIG. 5 is an explanatory diagram illustrating a process of evaluating residential satisfaction in a building. FIG. 6 is an explanatory diagram illustrating a process of evaluating residential satisfaction and automatically controlling related facilities.

Referring to FIG. 1, the system 1000 for evaluating residential satisfaction based on residents' personal tendencies and building sensing data includes a sensor group 100, a user terminal 200, a network 300, a server 400, a database 500, and a control target 600.

Hereinafter, the residential satisfaction evaluation system 1000 configured as described above will be described with reference to FIGS. 2 to 6.

Residential satisfaction (characteristics within a building) for an environment within a space felt by residents (users) living in the building is influenced by various factors. For example, the residential satisfaction can be affected by residential satisfaction influencing factors such as heat (temperature, humidity), brightness (illuminance), dust, noise, smell, congestion (comfort level), and skin temperature (feeling temperature). These residential satisfaction influencing factors can be measured by the sensor group 100 composed of various types of sensors.

Referring to FIG. 2, the sensor group 100 may include a temperature sensor 101, a humidity sensor 102, an illuminance sensor 103, a dust sensor 104, a noise sensor 105, a smell sensor 106, a congestion sensor 107, and a skin temperature sensor 108.

The temperature sensor 101 measures the temperature in the building and outputs a temperature measurement value. The humidity sensor 102 measures the humidity in the building and outputs a humidity measurement value. The illuminance sensor 103 measures the illuminance in the building and outputs an illuminance measurement value. The dust sensor 104 measures the dust in the building and outputs a dust measurement value. The noise sensor 105 measures the noise in the building and outputs a noise measurement value. The smell sensor 106 measures the smell in the building and outputs a smell measurement value. The congestion sensor 107 measures the congestion in the building and outputs a congestion measurement value. The skin temperature sensor 108 measures the skin temperature of residents in the building and outputs a skin temperature measurement value.

The user terminal 200 may participate in a residential satisfaction survey (e.g., a survey) through a web application or mobile application installed therein. The user terminal 200 may include a smartphone owned by a user or manager residing in the building.

As shown in FIG. 4, the server 400 analyzes the correlation (ST12) between physical and quantitative sensing data (ST11) collected through the sensor group 100 and emotional and qualitative residential satisfaction information (ST13) felt by the residents in the building and thereby predict and evaluate the residential satisfaction of residents. To this end, the server 400 may conduct a residential satisfaction survey on the environment in the space felt by the residents living in the building in various forms. For example, the residential satisfaction survey may be conducted in writing, through e-mail, or through the web application or mobile application of the user terminal 200.

In order for the server 400 to determine the residential satisfaction of the residents in the building, a highly accurate residential satisfaction survey targeting the residents is required in current physical environment conditions in the building. Such a residential satisfaction survey may be conducted in writing specified with various survey items or through the user terminal 200 as above.

As shown in FIG. 5, the server 400 distinguishes survey data that has been faithfully performed (ST21), identifies major influencing factors of residential satisfaction (ST22), analyzes and learns a correlation between the residential satisfaction and the influencing factors (ST23), and evaluates the residential satisfaction (ST24).

As shown in FIG. 3, the server 400 includes a survey unit (or a survey processor) 410, a user-specific random forest model learning unit (or a user-specific random forest model learning processor) 420, a user selecting unit (or a user selecting processor) 430, a building random forest model learning unit (or a building random forest model learning processor) 440, an item-specific adjustment and prediction unit (an item-specific adjustment and prediction processor) 450, a preferred section tracking unit (or a preferred section tracking processor) 460, and a control target controller 470.

The survey unit 410 conducts a survey on qualitative content such as residential satisfaction. The quality of data collected through such a survey is greatly influenced by individual tendencies such as residents' personality, opinion bias, emotional ups and downs, and conscientiousness. Therefore, in order to accurately derive, using the survey unit 410, a correlation between the physical/quantitative data collected through the sensor group 100 and the emotional/qualitative residential satisfaction information felt by residents in a building, two preprocessing steps are required as shown in FIG. 5.

First, it is necessary to distinguish the residential satisfaction survey data (number of people) obtained from residents who faithfully conducted the survey (ST21). Second, it is necessary to identify influencing factors that have a significant effect on the residential satisfaction of residents in a building (ST22). Such a series of preprocessing is necessary to systematically evaluate the residential satisfaction of a qualitative nature.

Upon receiving the survey result on the residential satisfaction from the user terminal 200 through the network 300, the survey unit 410 reads measurement values measured during a survey participation time of a resident among measurement values measured by sensors in the sensor group 100. The read measurement values are stored in the database 500 together with the survey result data.

The user-specific random forest model learning unit 420 trains a random forest model by using the sensor measurement values and the survey result data stored in the database 500 as training data. The sensor measurement values are used as feature values of training data, and the survey result data are used as correct answer values. In this process, random forest models are created as many as the number of residents who participated in the survey.

The user-specific random forest model learning unit 420 performs a role of distinguishing residential satisfaction survey data of survey respondents who faithfully conducted the survey among residents who participated in the survey. The residential satisfaction survey data of survey respondents whose participation (or conscientiousness) in the survey is lower than a predetermined reference value will act as noise in analyzing the correlation, thus deteriorating learning and prediction performance. In contrast, if the correlation is analyzed and the learning is performed for the residential satisfaction survey data of survey respondents whose participation (or conscientiousness) is higher than the predetermined reference value, the accuracy of the satisfaction evaluation system 1000 will be further increased.

In view of this, while employing a random forest used in machine learning, the user-specific random forest model learning unit 420 applies a method of measuring feature importance to filter out data with a low degree of participation and perform learning based on only data with a high degree of participation. Here, the random forest applied to the user-specific random forest model learning unit 420 is as follows.

The random forest is a method using numerous decision trees. It selects n features from among numerous features to create a decision tree, and repeatedly creates several decision trees. Each decision tree outputs a predicted value individually, and among such predicted values made by several decision trees, the value that comes out most often is determined as the final predicted value based on the majority rule. That is, this is a method of predicting by combining several weak models instead of using one strong model, and belongs to the ensemble learning method. One of advantages of the random forest model is that it is possible to check the importance of each feature used to predict the label in the learning process. The user-specific random forest model learning unit 420 utilizes a method for measuring the importance of each feature.

The user-specific random forest model learning unit 420 may configure user objects. In this embodiment, for example, a user object is configured by assuming a total of eight features of temperature, humidity, illuminance, dust, noise, smell, congestion, and skin temperature as residential satisfaction influencing factors. Since the same process can be applied even if any item is added later, the result is assumed to be the same.

The user-specific random forest model learning unit 420 assigns a predetermined specific score (e.g., 20 points) to each of the survey scores for a total of eight features, and configures a total of 160 points as a perfect score. A user object for data creation is created based on factors shown in Table 1 below.

TABLE 1

| Name | Description |
|---|---|
| user_id | Unique number for user identification |
| importance_features | Features that users value |

The user (that is, resident) created by including specific feature(s) in the importance_features gives 20 points only when that feature(s) must match the indoor appropriate value(s). Table 2 below shows the range of appropriate values (optimal values) for each residential satisfaction influencing factor and a rule for calculating deducted points assumed in this embodiment.

TABLE 2

| Feature | Appropriate values | Calculation of deducted points if appropriate value is not met |
|---|---|---|
| Temperature | 18~20 | 20 points - (temperature difference/2) |
| Humidity | 40~60 | 20 points - (humidity difference/2) |
| Illuminance | 700~1500 | 20 points - (illuminance difference/100) |
| Dust | 0~100 | 20 points - (dust difference/10) |
| Noise | 0~10 | 20 points - (noise difference/2) |
| Smell | — | 20 points - (smell value * 2) <br> * Smell values consists of values of 0 to 5 where 0 indicates no smell, and 5 indicates an odor. There is no specific appropriate value, and it is calculated using categorically classified smell values. |
| Congestion | 3~5 | 20 points - (congestion difference * 2) |
| Skin temperature | 30~34 | 20 points - (skin temperature difference * 2) |

For users whose value of importance features is not empty, the user-specific random forest model learning unit 420 randomly applies scores in a predetermined range (e.g., 16 to 20 points) to the other features. If the value of importance_features is empty, it is assumed that this user is an insincere participant with a low participation rate in the survey. For example, such a user responds to all survey scores with one value, or responds inconsistently and completely randomly.

The user-specific random forest model learning unit 420 generates 50 sincere participants, 30 insincere participants, and 20 very insincere participants for the survey, as shown in Table 3 below. In this case, it is assumed that 30 insincere participants fill out the questionnaire completely randomly and inconsistently, and 20 very insincere participants are assumed to be participants who consistently fill out 20 points unconditionally.

TABLE 3

```
# generate 50 sincere participants
users = list ( )
for user_id in range (0, 50)
    user = User (user_id, generate_features ( ))
    users.append (user)
# generate 30 insincere participants
```

TABLE 3-continued

```
for user_id in range (50, 80)
    user = User (user_id, [ ])
    users.append (user)
# generate 20 very insincere participants
for user_id in range (80, 100)
    user = User (user_id, [ ], True)
    users.append (user)
```

Table 4 below shows an example in which the user-specific random forest model learning unit 420 randomly generates survey data for a certain period of time (e.g., 540 days) for each user. Feature sensor values of the day are determined randomly as much as the range of numbers indicated in the annotation, and the participants made above conduct a survey on such features, and the results are stored in the database 500.

TABLE 4

```
for days in range (0, 540)
    # temperature 10~32
    ran_temp = ran.randrange (10, 33)
    # humidity 30~80
    ran_hum = ran.randrange (30, 81)
    # illuminance 200~1900 (100 units)
    ran_lux = ran.randrange (200, 1901, 100)
    # dust 70~150 (10 units)
    ran_dust = ran.randrange (70, 151, 10)
    # noise 1~20 (1 unit)
    ran_db = ran.randrange (1, 21, 1)
    # smell 0~5 ( 1 unit)
    ran_smell = ran.randrange (0, 6, 1)
    # congestion 1~10 ( 1 unit)
    ran_congestion = ran.randrange (1, 11, 1)
    # skin temperature 25~40 (1 unit)
    ran_skin = ran.randrange (25, 41, 1)
    for user in users:
        _s = user.score (. . .)
        user.save_survey (. . .)
```

Table 5 below shows an example of random forest learning in the user-specific random forest model learning unit 420. Taking user #1 as an example, some contents of 540 days are shown. Here, the numerical values for each item (temp, hum, . . . , skin) in the first line mean the sensor values measured at the time of conducting the survey on the corresponding day, and the last score value is the survey value input by user #1. It is assumed that the residential satisfaction influencing factors that user #1 considers important are humidity (hum), dust (dust), and skin temperature (skin).

TABLE 5

| User #1/importance features: ['hum', 'dust', 'skin'] | | | | | | | | | |
|---|---|---|---|---|---|---|---|---|---|
| no | temp | hum | lux | dust | decibel | smell | congestion | skin | score |
| 0 | 21 | 33 | 400 | 120 | 4 | 4 | 8 | 37 | 126 |
| 1 | 27 | 77 | 400 | 70 | 9 | 0 | 6 | 37 | 124 |
| 2 | 10 | 73 | 1900 | 100 | 4 | 1 | 3 | 25 | 116 |
| 3 | 26 | 75 | 1500 | 110 | 14 | 5 | 3 | 31 | 139 |
| 4 | 21 | 78 | 500 | 70 | 8 | 4 | 5 | 25 | 121 |

| Column | Description |
|---|---|
| no | Survey # |
| temp | Temperature |
| hum | Humidity |
| lux | Illuminance |
| dust | Dust |
| decibel | Noise |
| smell | Smell |

TABLE 5-continued

| | |
|---|---|
| congestion | Congestion |
| skin | Skin temp. |
| score | Survey Score |

The following is a description of learning data and target data used in the user-specific random forest model learning unit 420. The satisfaction with the living space in the building was learned using a random forest model for each survey participant of a certain number (e.g., 100 people), so that 100 random forest models for this were obtained. Here, by recording the features evaluated as having high importance among the features used to predict the label by the random forest, it is possible to check the difference between randomly generated users with high participation and those with low participation.

Table 6 below shows a part of the ranking list of users with high participation in the survey. As shown in Table 6, participants with a high level of participation are ranked from 0 to 49 in the participant list. Here, imp features refer to features that participants consider important, and RF imp features refer to features that are most important in predicting a particular participant's survey score in random forest (RF) learning. In the case of most (47 out of 50) participants with a high degree of participation, it can be seen that the features that participants actually consider important and reflect in the survey score and the features that are most important when the RF model learns the score prediction according to a feature change match each other.

TABLE 6

| user id | imp features | RF imp features |
|---|---|---|
| 0 | 0 | temp,hum,lux,dust,smell, skin | temp,hum,lux,decibel,smell, skin |
| 1 | 1 | hum, dust, congestion | hum, dust, congestion |
| 2 | 2 | temp,hum,lux,dust, smell, skin | temp,hum,lux, dust,smell, skin |
| 3 | 3 | lux,dust,decibel,skin | lux,dust, decibel, skin |
| 4 | 4 | temp,hum,lux,dust,smell | temp,hum,lux, dust, smell |
| 5 | 5 | temp,hum,lux,dust, decibel | temp,hum,lux, dust,decibel |
| 6 | 6 | temp,hum,lux,decibel, skin | temp,hum,lux,decibel,skin |
| 7 | 7 | lux | lux |
| 8 | 8 | lux, dust, decibel, smell, congestion,skin | lux,dust, decibel,smell, congestion,skin |
| 9 | 9 | temp,lux, congestion,skin | temp,lux,congestion, skin |

The user selecting unit 430 selects a user having a feature-based scoring rule by referring to the feature importance supplied from the user-specific random forest model learning unit 420. That is, a feature-based score is reflected for a user who faithfully (correctly) participates in the survey based on the current feature in the building, which means that the random forest model can find the regularity of the feature-based score in the learning process.

If there is a regularity according to the feature, the feature importance of the random forest can indicate the feature having the most regularity in predicting the score of the corresponding user in the feature importance. In contrast, in the case of users who participated in the survey without regularity at all (e.g., users who give only one score or users who randomly assign points), the random forest cannot find regularities in the learning process, and thus no feature appears in the feature importance. When user filtering is performed by the user selection unit 430, only data of users who faithfully participate in the survey (e.g., users who have regularity in survey scores according to sensor measurement values) may be derived.

Figure 8:
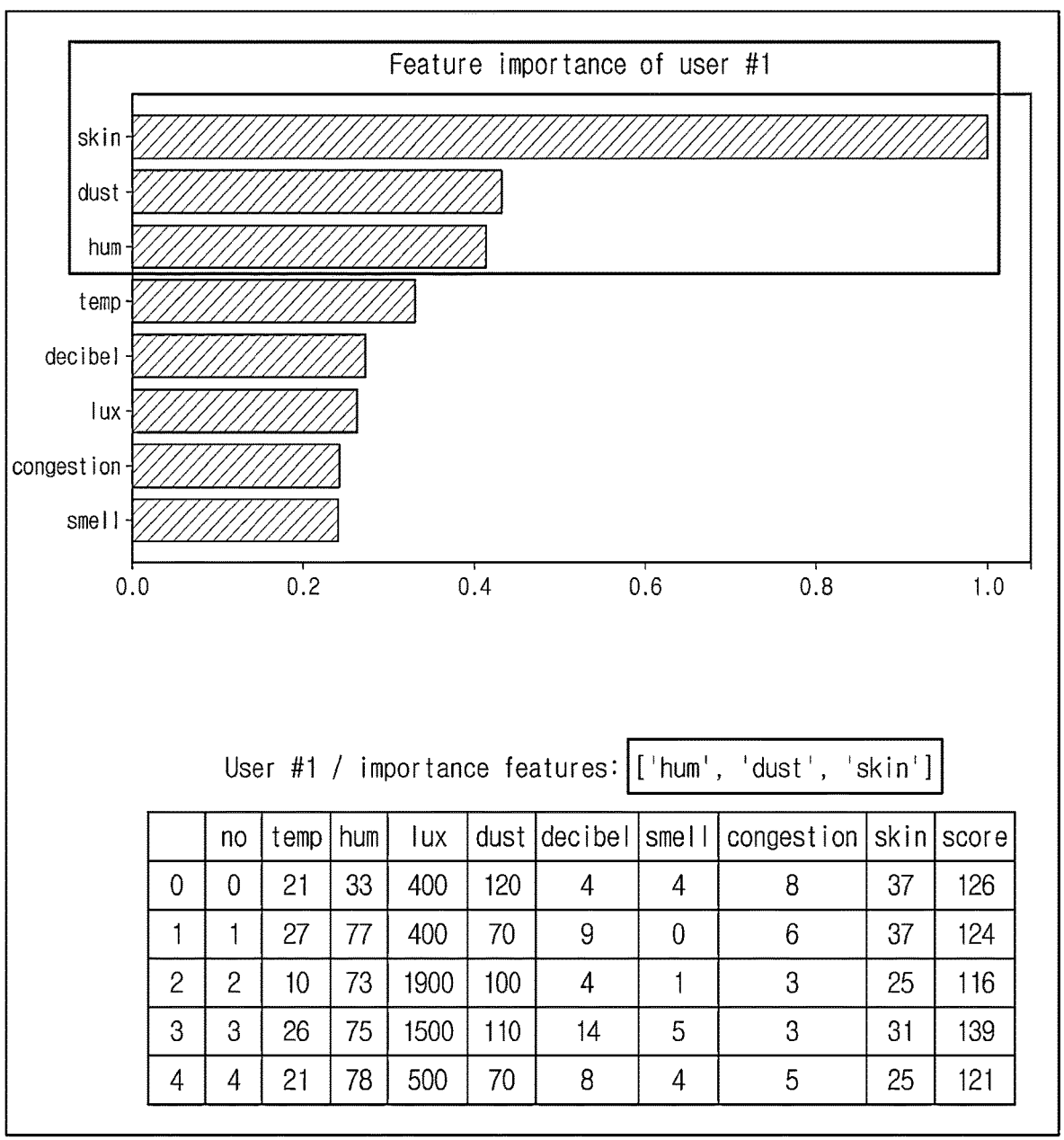
FIG. 8 shows Table 7.

As shown in Table 7 (shown in FIG. 8), it can be seen that the importance values of the features (left bar graph) used in the predictive learning of the random forest model of user #1 and the importance feature values of user #1 (right table) set initially are matched each other in the order of humidity, dust, and skin temperature.

Table 8 below shows the case of users with low participation. It can be seen that participants with low participation who randomly assign points are located in the ranking list of 50 to 79 (30 users), and participants with low participation who unconditionally fill in the survey with 20 points only are located in the ranking list of 80 to 99 (20 users). Since participants with low participation give a single score only or a score irrelevant to a feature, the RF model measures the importance of all features as 0, it can be seen that the feature importance does not appear in the RF model.

TABLE 8

| user id | imp features | RF imp features | mse |
|---|---|---|---|
| Low-participation Participants who assign points randomly | | | |
| 50 | 50 | | 719.330991 |
| 51 | 51 | | 676.505756 |
| 52 | 52 | | 768.789581 |
| 53 | 53 | | 716.400718 |
| 54 | 54 | | 731.316836 |
| 55 | 55 | | 609.640931 |
| 56 | 56 | | 861.878773 |
| 57 | 57 | | 648.431458 |
| 58 | 58 | | 704.948864 |
| 59 | 59 | | 696.204911 |
| Low-participation participants who fill out a survey with only one score | | | |
| 80 | 80 | | 0.0 |
| 81 | 81 | | 0.0 |
| 82 | 82 | | 0.0 |
| 83 | 83 | | 0.0 |
| 84 | 84 | | 0.0 |
| 85 | 85 | | 0.0 |
| 86 | 86 | | 0.0 |
| 87 | 87 | | 0.0 |
| 88 | 88 | | 0.0 |
| 89 | 89 | | 0.0 |

Figure 9:
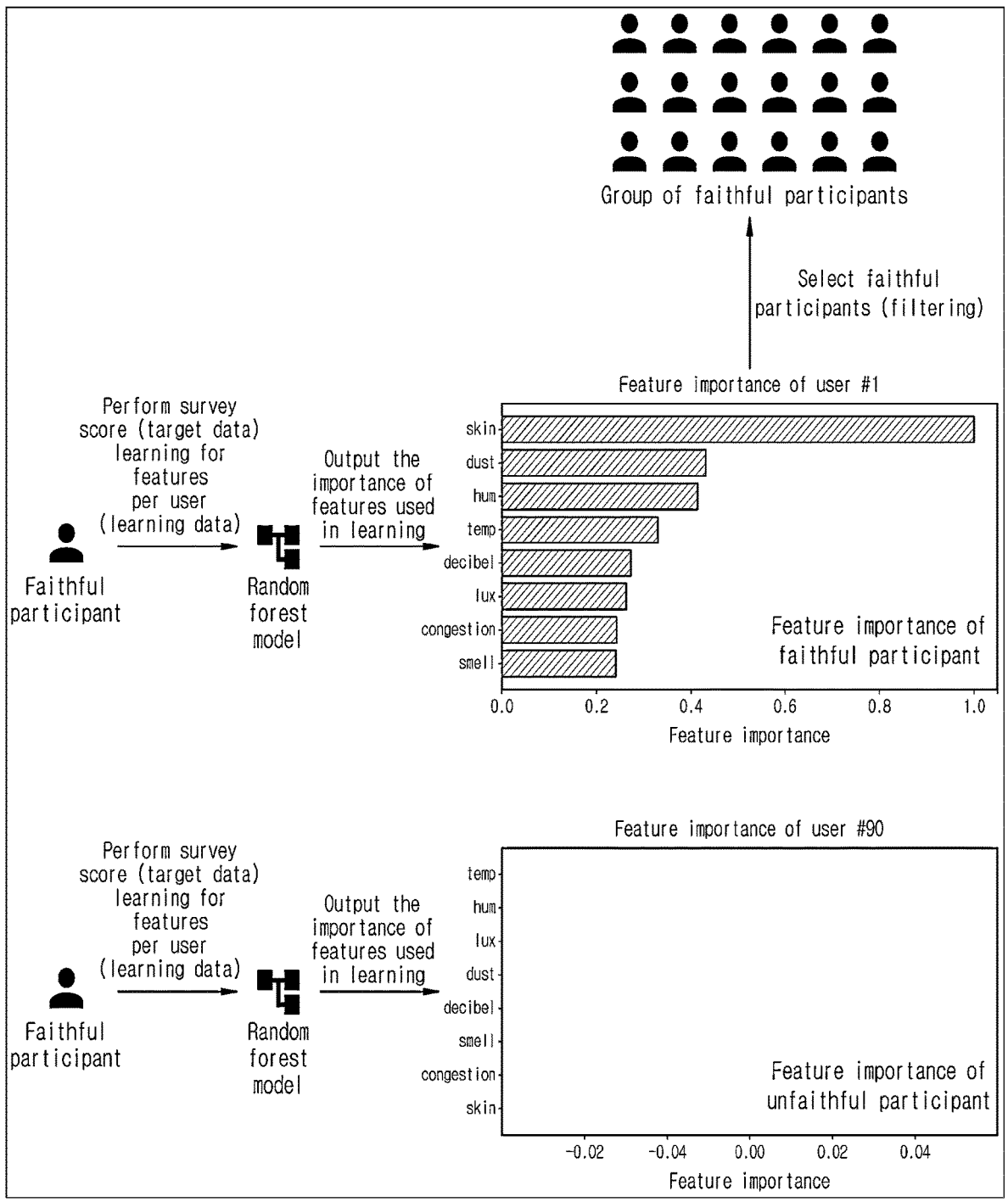
FIG. 9 shows Table 9.

As described above, it can be seen that when conducting a survey on satisfaction with residence in a building, it is possible to distinguish participants with high participation in the survey from those with low participation through the importance in the random forest machine learning (See Table 9 (shown in FIG. 9)).

The building random forest model learning unit 440 performs learning of a random forest model of the building itself based on data of residents having regularity derived by the user selecting unit 430. Here, a training dataset used is "sensor measurement values—an average survey score of users" in an overlapping time zone. The building random forest model learning unit 440 uses the sensor measurement values as feature values of training data as in the user-specific random forest model learning unit 420, and uses the average survey score of users as a correct answer value.

The building random forest model learning unit 440 predicts the exact residential satisfaction (preference) of users (residents) residing in a specific building or a specific space (room) in the building through learning of the random forest model. To this end, the building random forest model learning unit 440 calculates an average value of survey scores using survey data of users with high participation in the survey, and uses it as a risk level (label). In addition, the building random forest model learning unit 440 performs random forest learning using the features used as described above. As such, it is possible to identify major features in the order of features preferred by high-participation participants in a specific building or room.

Figure 10:
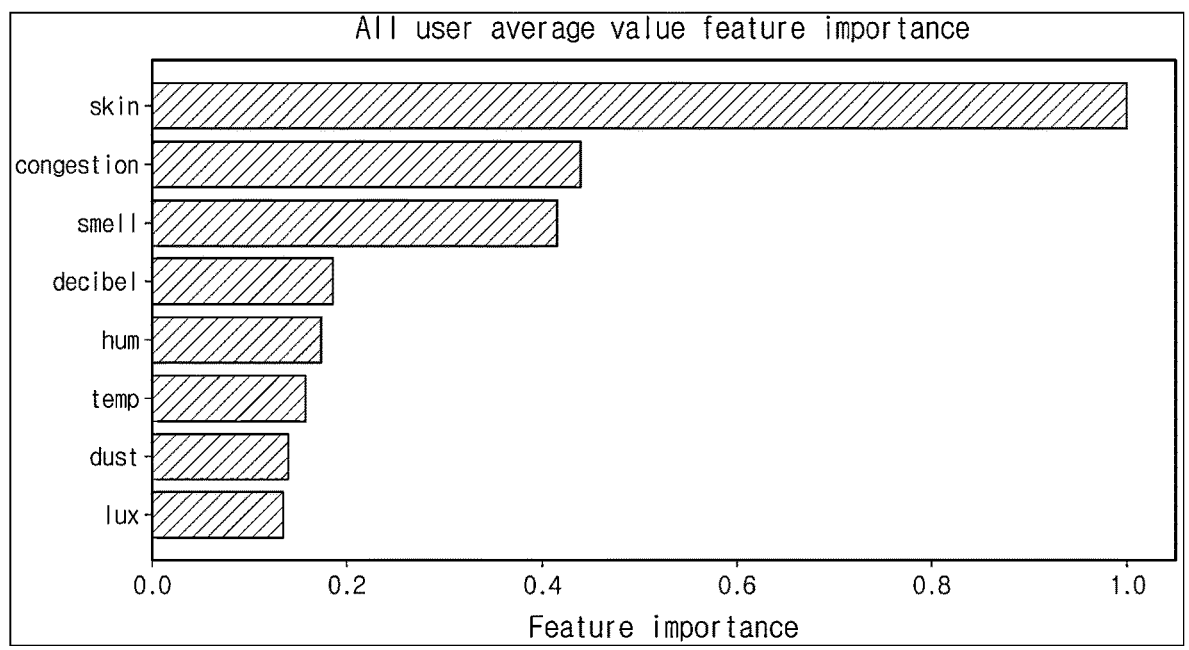
FIG. 10 shows Table 10.

Table 10 (shown in FIG. 10) shows the feature importance after the building random forest model learning unit 440 performs the random forest learning based on the survey results of 50 faithful participants. In this example, it can be seen that the features preferred by residents (users) in the building are in the order of skin temperature, congestion, smell, noise, humidity, temperature, dust, and illuminance.

Table 11 below shows the results of averaging the actual feature preferences of residents in the initial stage.

TABLE 11

| Actual feature preferences of users | | | | | | | |
|---|---|---|---|---|---|---|---|
| temp | hum | lux | dust | decibel | smell | congestion | skin |
| 24 | 28 | 24 | 28 | 24 | 24 | 25 | 32 |

In addition, Table 12 below shows a comparison between the user's actual feature preference rank and the feature preference rank using the random forest model. Here, the other features except for the features of the second and four rows (i.e., humidity and dust) do not differ greatly from the actual values in terms of rank. From the results in Table 12, it can be seen that the feature importance of the random forest using the average value and the ranking structure of the features actually preferred by the users are almost similar.

TABLE 12

| Comparison with random forest model feature preference | | |
|---|---|---|
| Feature | user's actual feature preference rank | random forest model feature preference rank |
| Temperature | 4 | 6 |
| Humidity | 2 | 5 |
| Illuminance | 4 | 8 |
| Dust | 2 | 7 |
| Noise | 4 | 4 |
| Smell | 4 | 3 |
| Congestion | 3 | 2 |
| Skin temperature | 1 | 1 |

Before the building random forest model learning unit 440 learns the building random forest model, the survey unit 410, the user-specific random forest model learning unit 420, and the user selecting unit 430 remove noise which may interfere with learning. In the embodiment, noise is represented as a group of unfaithful participants in the survey. Thereafter, the building random forest model learning unit 440 learns the random forest model of the building itself based on the data of users (i.e., residents) having regularity derived by the user selecting unit 430.

The item-specific adjustment and prediction unit 450 uses the random forest model of the building itself derived by the building random forest model learning unit 440 (i.e., a survey score prediction model according to building features) to perform predictive simulation for tracking a preferred section for each feature. When performing simulation, the value is adjusted (e.g., increased) one by one for each feature. In the case that only one feature value is changed, the simulation proceeds with the remaining feature values fixed.

The reason why the survey score prediction model according to building features is created and used is that an environment is prepared in which the survey score can be previewed while changing only the feature value in an arbitrary program without actually changing the facility. For example, in the case that the preferred section tracking unit 460 wants to track a preferred section of temperature, the item-specific adjustment and prediction unit 450 fixes the other feature values except for the temperature and changes only the temperature feature to predict the survey score by inputting feature values into the building random forest model generated through the survey unit 410, the user-specific random forest model learning unit 420, the user selecting unit 430, and the building random forest model learning unit 440.

Table 13 below exemplarily shows that the item-specific adjustment and prediction unit 450 predicts the survey score while increasing (adjusting) the feature value for each item of influencing factors on the residential satisfaction in the building, and indicates which range the participants prefer for each feature through the trained model.

TABLE 13

| Test results - user preferred section for each feature | | |
|---|---|---|
| Feature | Preferred section predicted | Preferred section set in actual user model |
| Temperature | 18~20 | 18~20 |
| Humidity | 39~41 | 40~60 |
| Illuminance | 1000~1200 | 700~1500 |
| Dust | 30~50 | 0~100 |
| Noise | 1~3 | 0~10 |
| Smell | 0~2 | The closer to 0, the higher the survey score |
| Congestion | 3~5 | 3~5 |
| Skin temperature | 31~33 | 30~34 |

When the item-specific adjustment and prediction unit 450 performs the survey score prediction as described above, the preferred section tracking unit 460 can track the user preferred section for each feature by obtaining a moving average value for each feature and tracking the maximum survey score section. A more detailed description of this is as follows.

When the item-specific adjustment and prediction unit 450 increases the value for each feature of the residential satisfaction influencing factors, tracking of the preferred section is performed with the other feature values fixed at 0. In addition, the item-specific adjustment and prediction unit 450 performs an analysis process in a sequence of obtaining a moving average value of the predicted values output and checking in which range of values for each feature the participants' survey scores are high. As shown in Table 13, it is possible to predict which range participants prefer for each feature through a model trained through the data of participants with a high degree of participation. Table 13 shows that when the user preferred section for each feature is obtained using the random forest prediction result and the moving average value, the obtained preferred section belongs to the range of preferred section initially set in the actual user model.

Referring to FIG. 6, influencing factors of residential satisfaction in a building are identified, and sensor measurement values for the influencing factors are obtained through the sensor group 100 (ST22). At the same time, a survey is conducted targeting users (i.e., residents in the building). In addition, faithful participants in the survey are distinguished by using feature importance through random forest model learning for each user and selecting users who have feature-based scoring rules (ST21). Thereafter, random forest model learning for the building is performed using an average survey score of the selected faithful participants (ST23, ST24). Then, users' survey scores according to building features (sensor measurement values) are predicted through a generated predictive model, and users' preferred sections for each feature are predicted by adjusting/analyzing feature values for each item (ST25).

The preferred section tracking unit 460 tracks the maximum survey score range by obtaining a moving average for each feature based on the feature values used for prediction in the item-specific adjustment and prediction unit 450 and the predicted survey score. As described above, in the case that only one feature value is changed in the item-specific adjustment and prediction unit 450, the survey score prediction result of the random forest model is derived with the remaining feature values fixed. The preferred section tracking unit 460 observes only a specific feature in the tracking process. The preferred section tracking unit 460 moves the predicted score according to the changing specific feature to a moving average value, and finds a section with the highest average predicted score for each feature through this tracking.

When the preferred section tracking unit 460 tracks the maximum survey score section as described above, the moving average value is used. For example, the preferred section tracking unit 460 tracks the maximum survey score range by starting from the moving average size 3 in the data list composed of temperature values and prediction values and increasing the size within the total number of data.

The preferred section tracking unit 460 derives a section of the maximum moving average value for each size, and finds data having a size-minimum temperature value-maximum temperature value-maximum moving average value. Thus, the preferred section tracking unit 460 can predict that the minimum value-maximum value range of the temperature item is a range that can receive the highest survey score of residents in the building random forest model.

Based on the user preferred section for each feature in the building tracked through the above series of processes, the control target controller 470 controls the air conditioning system in the building of the control target 600 with the feature section most preferred by residents.

The above-described components of the server 400 from the survey unit 410 to the control target controller 470 repeatedly perform the above-discussed process. In other words, whenever a new survey score (target data) is entered, they use it to train the building random forest model, track the maximum survey score section based on the learning result, and control the air conditioning system in the building of the control target 600 with the feature section most preferred by residents.

Referring to FIG. 6, as described above, the residential satisfaction survey scores of residents (users) residing in a specific building are predicted based on sensor measurement values for residential satisfaction influencing factors (temperature, humidity, illuminance, . . . , skin temperature). At the same time, the preferred section is predicted for each satisfaction influencing factor. The control target controller 470 automatically controls the control target 600 based on the preferred section prediction result (ST26). Accordingly, it is possible to perform feature control of facilities in the building, for example, air conditioners, lighting, air conditioners/heaters, ventilators, etc., through the control target 600. Here, the control target 600 may include a manager or an automation system. Therefore, it is possible to automatically control the related facilities for maintaining the preferred section for each feature of the residential satisfaction, and thereby optimally maintain the residential satisfaction (survey prediction score) of the residents in the building (ST27).

As described above, a survey on residential satisfaction in the building was conducted on 100 people, and divided into faithful participants and unfaithful participants, and based on the survey results of faithful participants, the preference ranking of the residential influencing factors that the participants considered important was predicted. As a result, it was confirmed that it is possible to relatively accurately predict the preference ranking of residential influencing factors.

Figure 11:
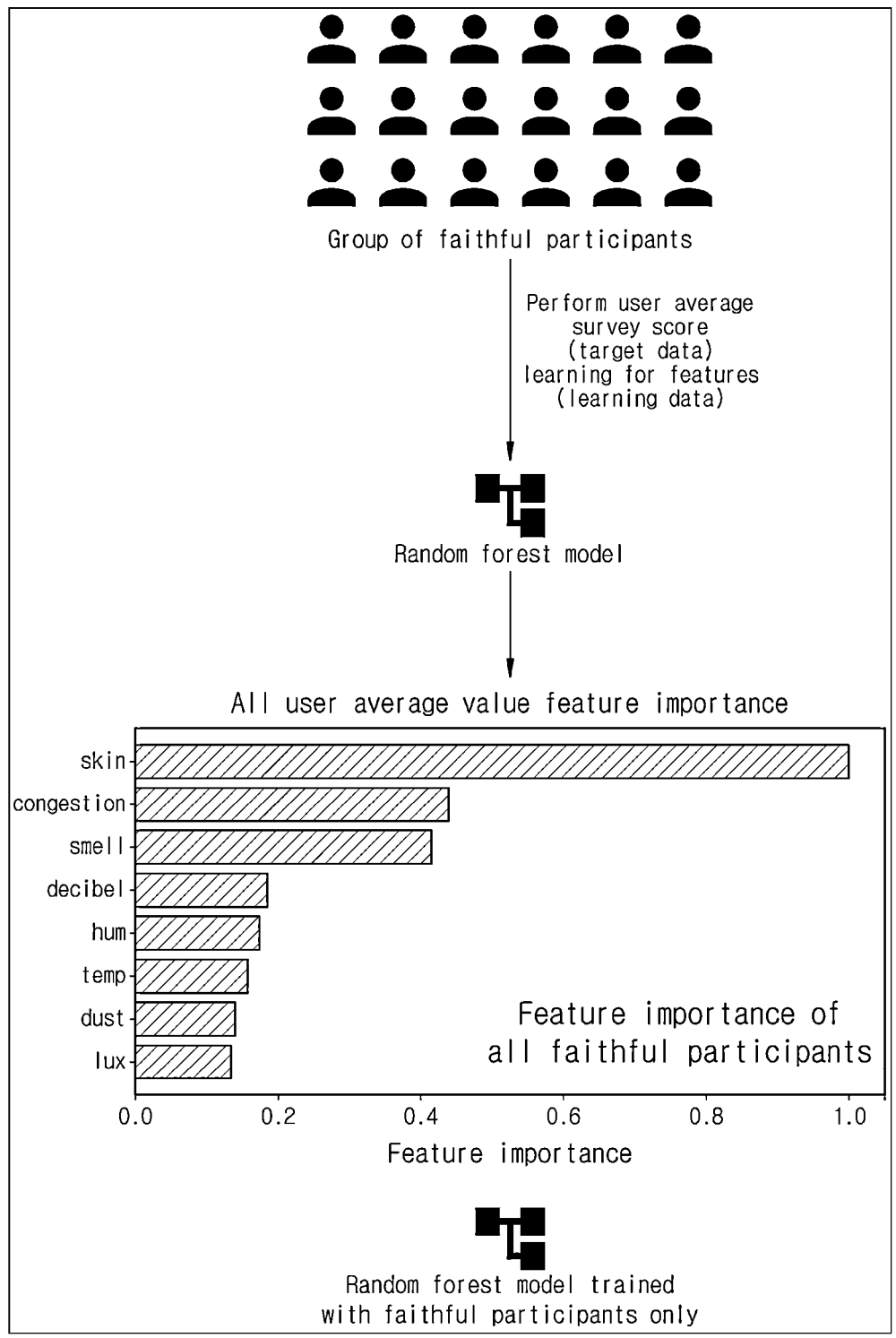
FIG. 11 shows Table 14.

Table 14 (shown in FIG. 11) shows whether the building random forest model, which was created using only the data of the faithful participant group from which noise was removed through the predictive survey simulation, can serve as a predictive model.

By making a prediction for a new survey and comparing it with the actual value, the prediction accuracy of the survey could be checked. To this end, a random forest learning model of a specific building or room was created only with highly engaged participants. The result of analyzing/checking a difference between the average survey score of highly participating participants and the predicted value of the model by performing a new survey simulation 500 times is shown in Table 15 below. That is, it can be confirmed that there is a slight difference from the actual preferred feature preference ranking, but there is no significant difference from the actual predicted survey score result value.

TABLE 15

| Results | | |
|---|---|---|
| Actual survey score (average) | Predicted survey score | Error |
| 132.12 | 132.6004 | 0.4804 |
| 130.22 | 131.5950 | 1.3750 |
| . . . | . . . | . . . |
| | Mean error −2.595 | |

Figure 12:
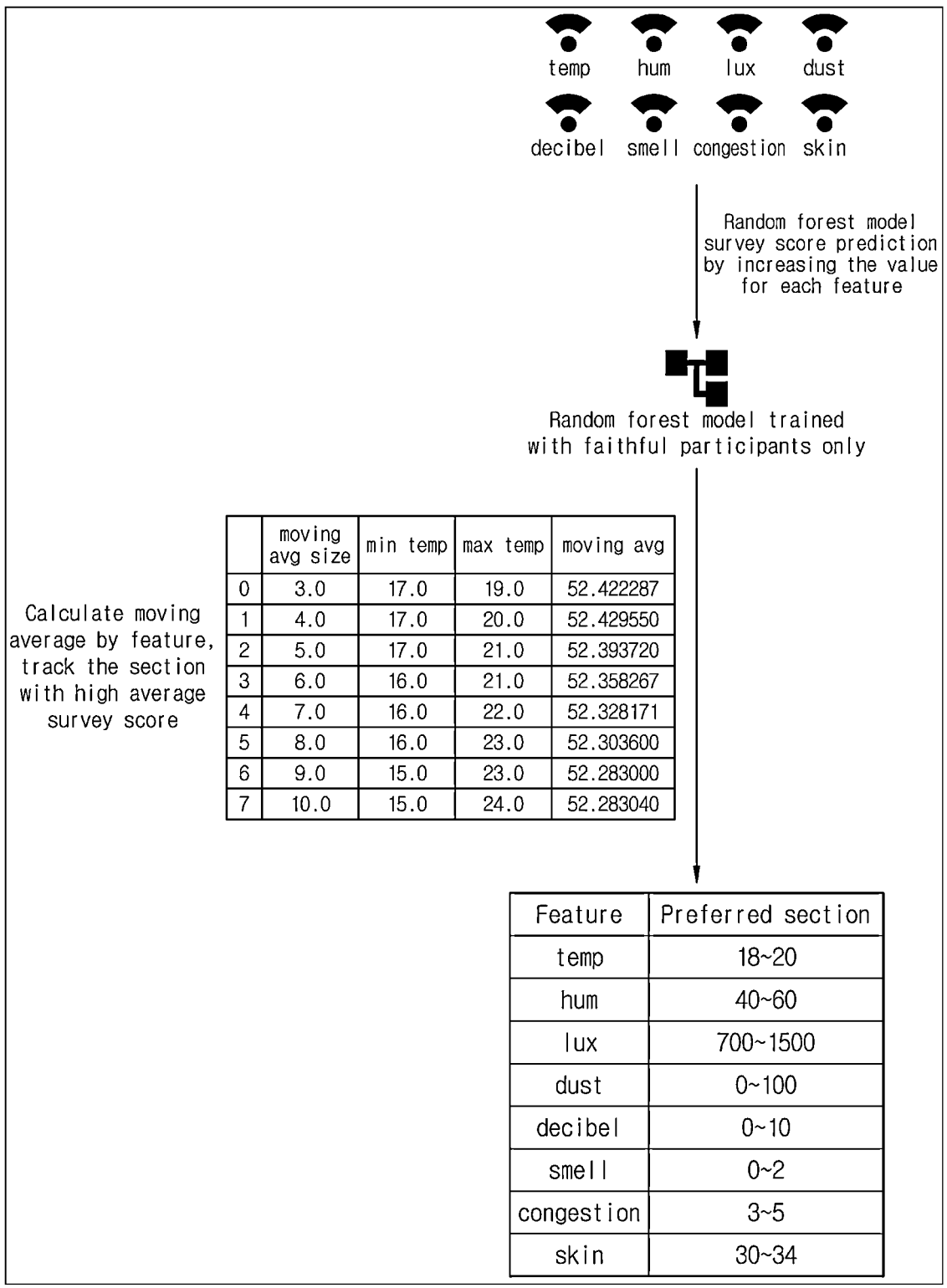
FIG. 12 shows Table 16.

Table 16 (shown in FIG. 12) exemplarily shows that a model trained on 50 highly engaged participants can make good predictions. In other words, it indicates to what extent the participants give a high survey score for each feature and whether they are satisfied with it.

Summarizing the above description, through components from the survey unit 410 to the building random forest model learning unit 440, the server 400 compares the ranks of the actual resident feature preference and the ranks of the building random forest model feature preference. In addition, through the item-specific adjustment and prediction unit 450 and the preferred section tracking unit 460, the building random forest model created using only the data of the faithful participation group from which noise has been removed serves as a prediction model.

Figure 7:
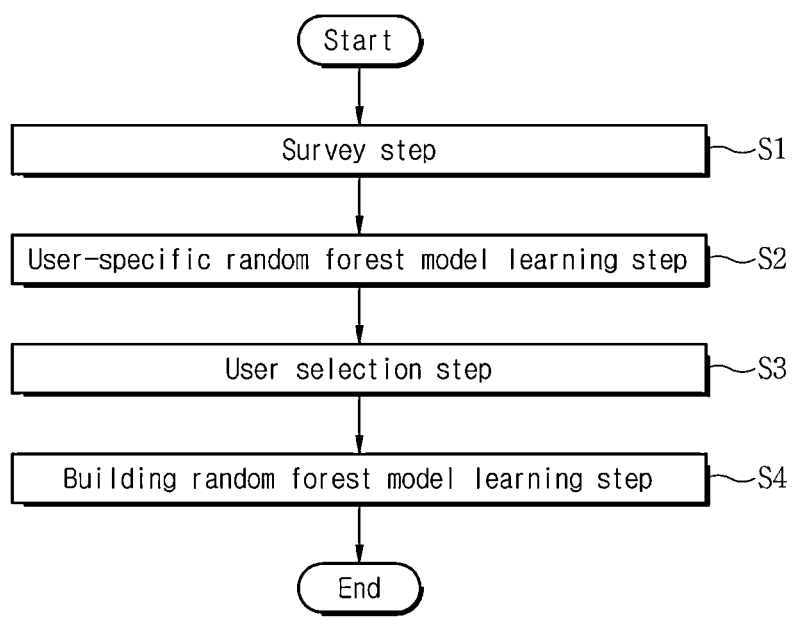
FIG. 7 is a flow chart illustrating a residential satisfaction evaluation method based on residents' personal tendencies and building sensing data, according to an embodiment of the present disclosure.

Meanwhile, FIG. 7 is a flow chart illustrating a residential satisfaction evaluation method based on residents' personal tendencies and building sensing data, according to an embodiment of the present disclosure.

Referring to FIG. 7, the residential satisfaction evaluation method based on the residents' personal tendencies and building sensing data according to the present invention includes a survey step (S1), a user-specific random forest model learning step (S2), a user selection step (S3), and a building random forest model learning step (S4).

At the survey step (S1), the survey unit 410 collects sensing data obtained through the sensor group 100, and also collects survey result data according to a survey conducted targeting residents (users) in the building. Here, the sensing data obtained through the sensor group 100 refers to data measured from the temperature sensor 101, the humidity sensor 102, the illuminance sensor 103, the dust sensor 104, the noise sensor 105, the smell sensor 106, the congestion sensor 107, and the skin temperature sensor 108 provided in the sensor group 100. The survey result data refers to data obtained through a survey conducted through communication manners including the user terminals 200.

At the user-specific random forest model learning step S2, the user-specific random forest model learning unit 420 uses the sensing data and the survey result data as training data to learn the random forest model. At this step, the user-specific random forest model learning unit 420 removes data with a low participation rate in the survey and performs learning using only data with a high participation rate.

At the user selection step (S3), the user selection unit 430 selects users having a score regularity according to features by referring to the feature importance supplied from the user-specific random forest model learning unit 420.

At the building random forest model learning step (S4), the building random forest model learning unit 440 performs learning of the random forest model of the building itself based on the data of users having regularity derived from the user selection unit 430 and predicts residential satisfaction.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A system for evaluating residential satisfaction of users living in a building, based on personal tendencies of the users and sensing data collected in the building, the system comprising:
   a sensor group configured to sense residential satisfaction influencing factors, which affect the residential satisfaction, and output the sensing data;
   user terminals configured to participate in a residential satisfaction survey;
   and a server configured to:
      evaluate the residential satisfaction of the users by analyzing a correlation between the sensing data and residential satisfaction information obtained from the residential satisfaction survey conducted through a communication manner including the user terminals, and
      control an air conditioning system in the building of a control target by predicting a feature-based preferred section of the users through random forest model learning,
   wherein the server includes:
      a survey processor configured to collect the sensing data and collecting survey result data according to the residential satisfaction survey conducted targeting the users in the building;
      a user-specific random forest model learning processor configured to:
         train a random forest model by using the sensing data and the survey result data as training data,
         remove data with a participation rate lower than a predetermined reference value in the residential satisfaction survey, and
         perform learning only with data with a participation rate higher than the predetermined reference value;
      a user selecting processor configured to select a user having a feature-based scoring rule by referring to a feature importance supplied from the user-specific random forest model learning processor; and
      a building random forest model learning processor configured to perform learning of a random forest model of the building itself based on data of users having regularity derived by the user selecting processor,
   wherein the user selection processor is configured to select users who have the feature-based scoring rule as users who faithfully participate in the residential satisfaction survey, and derive only data of users who have regularity in survey scores, and
   wherein a training dataset used in the random forest model by the building random forest model learning processor comprises sensor measurement values supplied by the survey processor, and an average survey score of users supplied by the user selecting processor.

2. The system of claim 1, wherein the residential satisfaction influencing factors in the sensor group include one or more of heat, brightness, dust, noise, smell, congestion, or skin temperature.

3. The system of claim 1, wherein the survey processor is configured to perform preprocessing to distinguish residential satisfaction survey data obtained from users who faithfully conducted the residential satisfaction survey and to identify influencing factors that have a significant effect on the residential satisfaction of the users in the building.

4. The system of claim 3, wherein the survey processor is configured to distinguish the residential satisfaction survey data of survey respondents who faithfully conducted the residential satisfaction survey among users who participated in the residential satisfaction survey.

5. The system of claim 1, wherein the user-specific random forest model learning processor is configured to record features evaluated as having high importance among features used to predict a label by a random forest in learning data and target data used in model learning.

6. The system of claim 1, wherein the user-specific random forest model learning processor is configured to perform learning of the random forest model by configuring user objects including one or more of temperature, humidity, illuminance, dust, noise, smell, congestion, and skin temperature as the residential satisfaction influencing factors, assign a predetermined specific score to each residential satisfaction influencing factors, and apply a range of appropriate values for each residential satisfaction influencing factor and a rule for calculating deducted points.

7. The system of claim 1, wherein the building random forest model learning processor is configured to use the sensor measurement value as a feature value of training data, and use an average survey score of the users as a correct answer value.

8. The system of claim 1, wherein the building random forest model learning processor is configured to calculate an average value of survey scores using survey data of users whose participation in the residential satisfaction survey is higher than a predetermined reference value.

9. The system of claim 8, wherein the building random forest model learning processor is configured to use the calculated average value as a risk level or label.

* * * * *